United States Patent
Martensson et al.

(10) Patent No.: US 8,196,617 B2
(45) Date of Patent: Jun. 12, 2012

(54) VAPOR RECOVERY DETECTION MEANS

(75) Inventors: Mattias Martensson, Lund (SE); Bengt I. Larsson, Skivarp (SE)

(73) Assignee: Dresser, Inc., Addison, TX (US)

( * ) Notice: Subject to any disclaimer, the term of this patent is extended or adjusted under 35 U.S.C. 154(b) by 851 days.

(21) Appl. No.: 12/252,535

(22) Filed: Oct. 16, 2008

(65) Prior Publication Data

US 2009/0101229 A1      Apr. 23, 2009

(30) Foreign Application Priority Data

Oct. 16, 2007   (EP) .................................... 07118611

(51) Int. Cl.
*B65B 31/00*    (2006.01)
(52) U.S. Cl. ................ 141/52; 141/47; 141/59; 141/67; 141/290
(58) Field of Classification Search ............ 141/59, 141/94, 225, 290, 47, 52, 67; 200/81.9 R, 200/81.9 M; 138/46; 137/601.2
See application file for complete search history.

(56) References Cited

U.S. PATENT DOCUMENTS

| 6,334,470 B2 * | 1/2002 | Healy ............................ 141/59 |
| 6,418,981 B1 | 7/2002 | Nitecki et al. |
| 2001/0001179 A1 | 5/2001 | Healy |

FOREIGN PATENT DOCUMENTS

| EP | 1101728 | 5/2001 |
| EP | 2050711 | 4/2009 |

OTHER PUBLICATIONS

Extended European Search Report for EP Application No. 07118611.8 dated Mar. 26, 2008, 5 pages.

* cited by examiner

*Primary Examiner* — Timothy L Maust
(74) *Attorney, Agent, or Firm* — Woodcock Washburn LLP

(57) ABSTRACT

A vapor recovery system for recovering fuel vapor from a vehicle tank during dispensing of fuel into the vehicle tank. The vapor recovery system comprises a vapor recovery line for transporting fuel vapor, and detecting device for detecting a fuel vapor flow. The detecting device comprises a housing having a vapor inlet and a vapor outlet, a body movably arranged in the housing, and a sensor arranged to detect a location of the body within the housing. The body is configured to move from a first position in the housing to a second position in the housing in dependence of a rate of fuel vapor flow flowing from the vapor inlet to the vapor outlet.

12 Claims, 3 Drawing Sheets

VAPOR RECOVERY DETECTION MEANS

CLAIM OF PRIORITY

Under 35 U.S.C. §119, this application claims the benefit of a foreign priority application filed in the European Patent Convention, serial number 07118611.8, filed Oct. 16, 2007, the entire contents of which are hereby incorporated by reference.

TECHNICAL FIELD

The present invention relates to a vapor recovery system for recovering fuel vapor from a vehicle tank during dispensing of fuel into the vehicle tank, the vapor recovery system comprising a vapor recovery line for transporting fuel vapor, and detecting device for detecting a fuel vapor flow.

BACKGROUND ART

When filling the tank of a motor vehicle, it is a common measure to recover the vapor escaping the tank when filling it with liquid fuel from a fuel pump unit. The liquid fuel is usually drawn from an underground fuel reservoir. The vapor recovery is performed by a system which is incorporated in the fuel pump unit, such that vapor of hydrocarbons are prevented from escaping to the environment outside the tank of the motor vehicle. Such a vapor recovery system typically consists of a vapor pump, a flow meter and a vapor inlet arranged at a fuel dispensing nozzle. The recovered vapor is returned to the underground fuel reservoir. The vapor pump draws fuel vapor from the tank of the motor vehicle, through the vapor flow meter and to the fuel reservoir. The flow meter constantly measures the vapor flow and compares the measured value with the flow of dispensed fuel. Adjusting means are connected to the flow meter and to the vapor pump, and are configured to control the rate of vapor flow so that it matches the flow rate of the dispensed fuel.

It is important that the vapor flow rate corresponds to the fuel rate, and, accordingly, there is a need for a reliable way to check that vapor flows into the vapor tank while dispensing fuel.

There are several techniques for monitoring a vapor flow.

EP-1,101,728, for example, discloses a fuel dispensing system which includes vapor flow and hydrocarbon concentration sensors positioned in a vapor line, normally the vapor recovery line, to provide accurate feedback relating to the vapor flow rate and concentration of hydrocarbon laden vapor recovered by a vapor recovery system. The sensors provide diagnostic information about the vapor recovery process as well as ensure that the vapor recovery process is carried out in an efficient manner.

U.S. Pat. No. 6,418,981 discloses a dispensing installation for fuel or other volatile liquids which comprises a storage tank, a pipe and a pump for dispensing fuel, a vapor recovery pipe and pump for recovering vapor and delivering it back to the tank, and a controller maintaining the vapor delivery rate approximately equal to the liquid delivery rate. In order to check that the vapor recovery system is operating correctly, the vapor delivery rate is constantly detected and compared with a value of the liquid delivery rate. If the result of the comparison is outside a predetermined range, an alarm is triggered in order to indicate a malfunction.

SUMMARY OF THE INVENTION

According to a first aspect of the invention a vapor recovery system is provided for recovering fuel vapor from a vehicle tank during dispensing of fuel into the vehicle tank, the vapor recovery system comprising a vapor recovery line for transporting fuel vapor and detecting device for detecting a fuel vapor flow. The detecting device comprises a housing having a vapor inlet and a vapor outlet, a body movably arranged in the housing, and a sensor arranged to detect a location of the body within the housing, the body being configured to move from a first position in the housing to a second position in the housing in dependence of a rate of fuel vapor flow flowing from the vapor inlet to the vapor outlet. An advantage of certain implementations of the inventive system is that verification of the fuel vapor flow in the vapor recovery system is facilitated in a simple way. Since the body moves in dependence of a rate of fuel vapor flow, it is easy to verify a vapor mass flow by detecting the movement of the body.

The body may be configured to allow, when the body is in the second position, a relatively higher rate of vapor flow from the vapor inlet to the vapor outlet, in comparison with the rate of vapor flow from the vapor inlet to the vapor outlet when the body is in the first position.

The body may comprise a first side defining a first housing cavity at an inlet side of the housing, and a second side defining a second housing cavity at an outlet side of the housing.

The body may comprise a channel extending from the first side of the body to the second side of the body.

The housing may comprise a blocking member configured to at least partially obstruct the channel of the body when the body is in the second position. In this implementation, the body is not returned to its first position until the vapor flow rate is smaller than the vapor flow rate needed to move the body from its first position.

The body may further comprise at least one groove configured to connect the first housing cavity with the second housing cavity when the body is in the second position. In this implementation, a bigger vapor flow is allowed to pass from the vapor inlet through the housing to the vapor outlet.

The groove may be at least partially obstructed when the body is in the first position.

An inner surface of the first housing cavity may at least partially obstruct the groove in the body when the body is in the first position.

The body may comprise a damper configured to damp a movement of the body, which is advantageous in that any wear of the body will be reduced.

The housing may further comprise a resilient member at least partially arranged between the body and the housing, for restraining a movement of the body.

The body may comprise a magnet, the sensor being configured to detect the magnet, for facilitating a simple way of detecting a movement of the body.

The body may be configured to move from the first position to the second position when a pressure in the first housing cavity exceeds a pressure in the second housing cavity by a specific value.

According to another aspect of the invention, a fuel dispensing unit for refueling vehicles is provided comprising a vapor recovery system according to the above. The inventive fuel dispensing unit may incorporate any of the features described above in association with the inventive vapor recovery system, and has corresponding advantages.

The fuel dispensing unit may further comprise a control unit connected to the sensor, the control unit being configured to monitor dispensing of fuel, and to provide a fault signal if the body is in the first position when fuel is dispensed. This is advantageous in that the control unit is able to stop the filling-up process if the fault signal is provided. Accordingly, little or no fuel vapor will escape to the environment.

BRIEF DESCRIPTION OF THE DRAWINGS

Embodiments of the present invention will now be described, by way of example, with reference to the accompanying schematic drawings, in which.

DETAILED DESCRIPTION OF THE EMBODIMENTS

Figure 1:
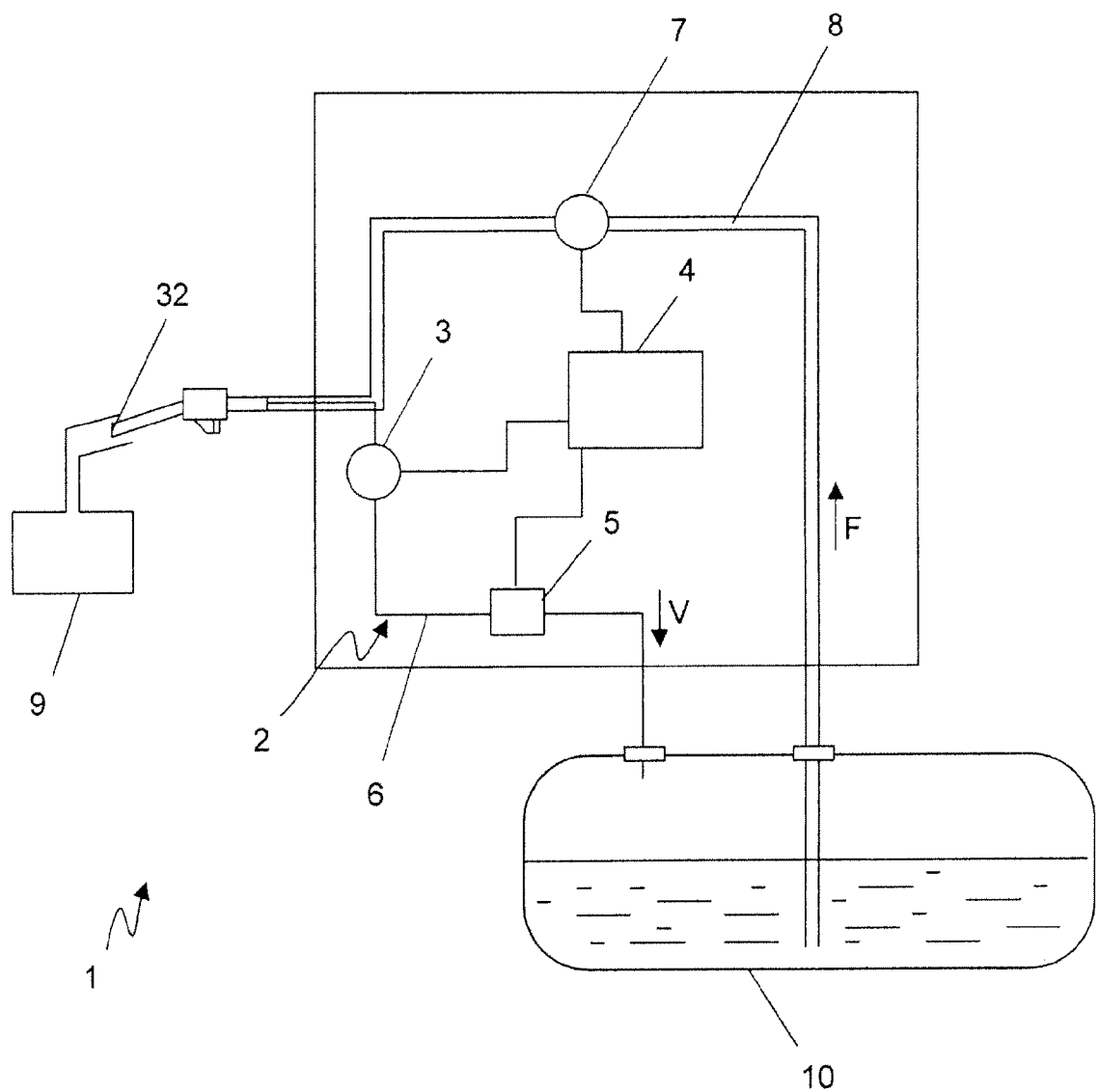
FIG. 1 is a schematic view of a fuel dispensing unit.

FIG. 1 illustrates a fuel dispensing unit 1 with a vapor recovery system 2 for recovering vapor from a motor vehicle tank 9 during filling-up. The vapor recovery system 2 has vapor recovery line 6 with a vapor pump 3, drawing vapor from the vehicle tank 9 to a fuel reservoir 10. Detecting device 5 are arranged in the vapor recovery line 6 for detecting a fuel vapor flow during the filling-up process. If no fuel vapor flow can be detected the filling-up process will be terminated.

The vapor recovery system 2 shown in FIG. 1 conveys a stream of fuel vapor V from a vapor inlet nozzle 32 at the vehicle tank 9 to the fuel reservoir 10 through the vapor recovery line 6. A vapor pump 3 is arranged in the vapor recovery line 6 between the vapor inlet 32 and the fuel reservoir 10. The vapor recovery line 6 has detecting device 5 located between the vapor pump 3 and the fuel reservoir 10. Fuel is pumped from the fuel reservoir 10 through the fuel line 8 into the vehicle tank 9 by means of a fuel pump 7 that produces a fuel stream F. A control unit 4 is connected to the vapor pump 3, the detecting device 5 and the fuel pump 7.

Figure 2:
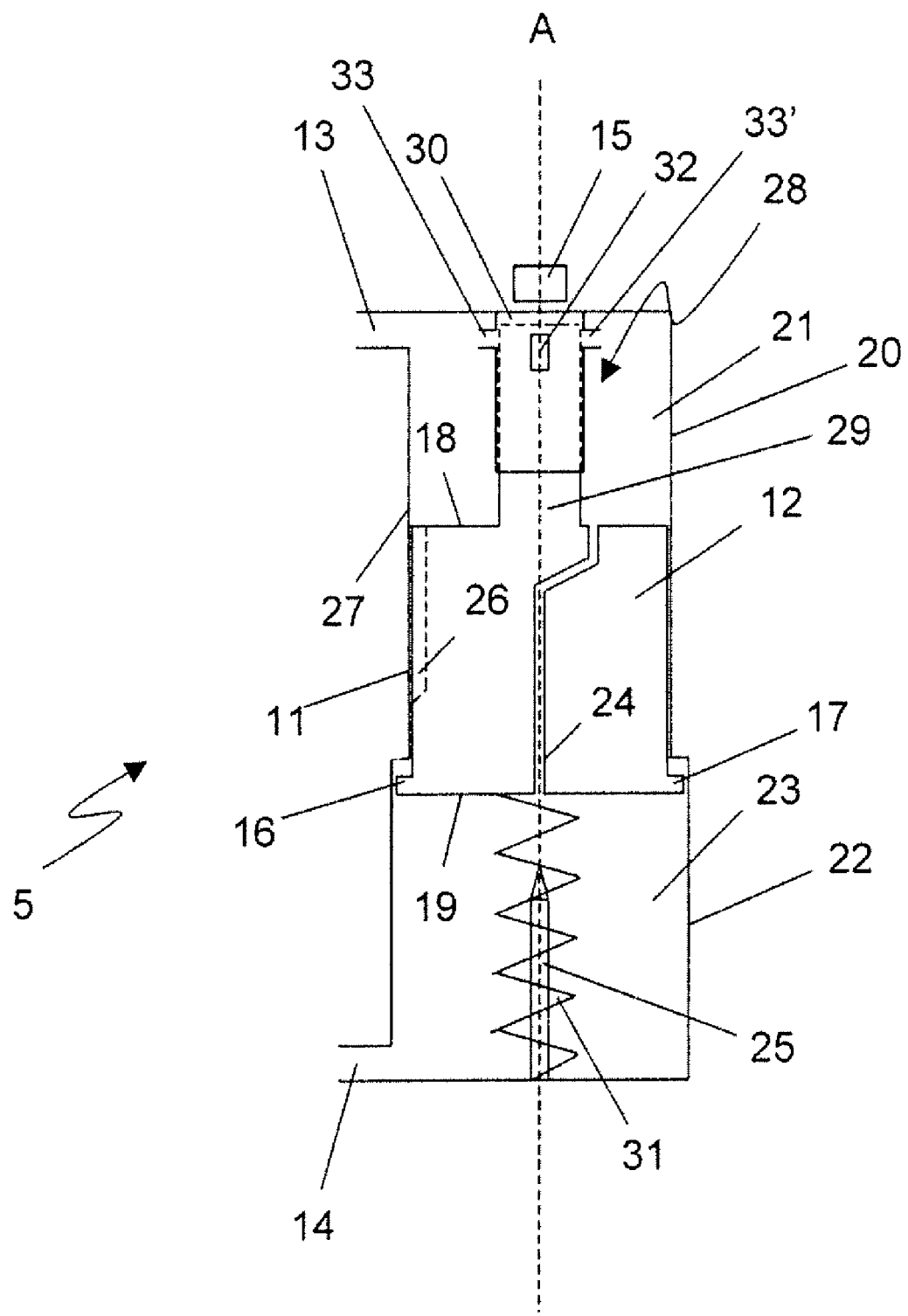
FIG. 2 is a schematic view of the detecting device when the body is in the first position.

In FIG. 2, an implementation of the detecting device 5 is illustrated and comprises a housing 11 and a body 12 in a first position. The housing 11 is shaped as a cylinder with two different diameters and has a vapor inlet 13 and a vapor outlet 14. The body 12 is moveable inside the housing 11 along axis A and separates the housing 11 into two sides, an inlet side 20 and an outlet side 22. The inlet side 20 has a first housing cavity 21 and the outlet side 22 has a second housing cavity 23. The body 12 comprises two projections 16, 17 for keeping the body stable along a direction transversal to the axis A. The body 12 has a first side 18 facing the inlet side 20 and a second side 19 facing the outlet side 22. On the first side 18 of the body 12 a damper 28 is arranged. The damper 28 comprises a first damper part 29 integrated in the body 12 and configured to fit into a second damper part 30 integrated in the housing 11. The two damper parts 29, 30 cooperate in a piston/cylinder like relationship. The second damper part 30 has two damper openings 33, 33' for preventing a rise of vacuum within the housing damper part 30. Different sizes of the damper 28 give different damper characteristics. Of course, the damper opening 33, 33' may be omitted and be functionally replaced by a clearance between the damper parts 29, 30. A magnet 32 is connected to the first damper part 29. A resilient member 31 is arranged between the second side 19 of the body 12 and the housing 11, and biases the body 12 in a direction along the axis A, towards the inlet side 20 of the housing 11. The resilient member 31 keeps the body 12 in the first position when the vapor recovery system 2 is not operated. In the second housing cavity 23 of the housing 11 a blocking member 25 is arranged. A channel 24 extends from the first side 18 of the body 12 to the second side 19 of the body 12 connecting the first housing cavity 21 with the second housing cavity 23. The housing 11 has an inner surface 27 surrounding the body 12. The body 12 has a groove 26 starting at the first side 18 and extends towards but not all the way to the second side 19. A sensor 15 is connected to the housing 11 for detecting the magnet 32. Preferably, the sensor 15 is a reed switch or a Hall-effect sensor.

Figure 3:
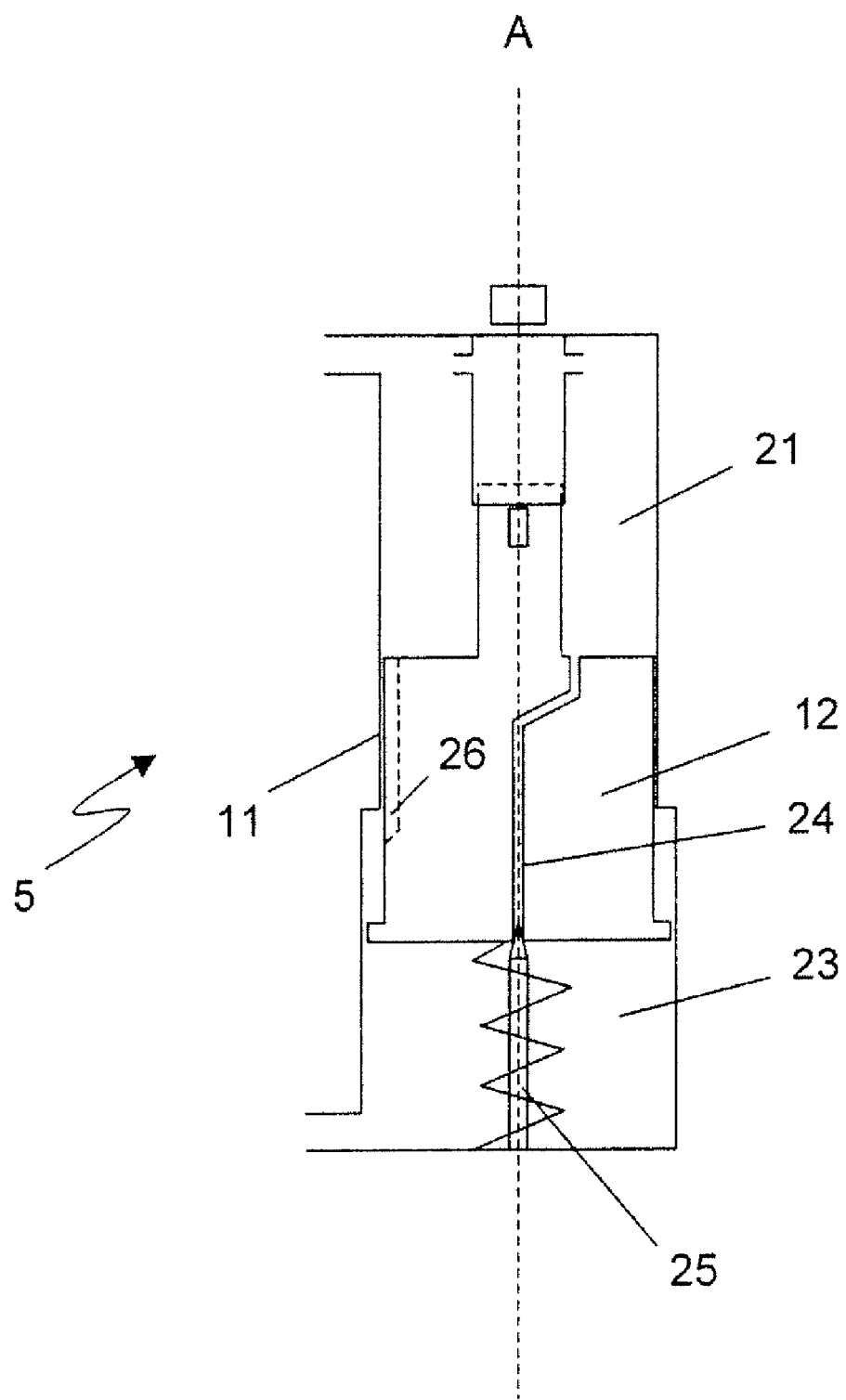
FIG. 3 is a schematic view of the detecting device when the body is in the second position.

In FIG. 3 the detecting device 5 are illustrated with the body 12 in a second position.

When the fuel dispensing unit 1 is not in use, there is no vapor flow and the body 12 inside the housing 11 is located in the first position. In the first position, the inner surface 27 (shown in FIG. 2) obstructs the groove 26 in the body 12 and thereby prevents any vapor from flowing from the first housing cavity 21 via the groove 26 to the second housing cavity 23. The body 12 is in the first position since no fuel vapor or only a leakage of fuel vapor flows through the housing 11. A leakage flow of fuel vapor can always flow from the first housing cavity 21 via the body 12 to the second housing cavity 23 due to the channel 24.

During the filling-up of a vehicle, the vapor pump 3 starts to pump fuel vapor from the vehicle tank 9. When vapor flows through the vapor inlet 13 of the housing 11, the pressure in the first housing cavity 21 increases. At a certain point, where the pressure in the first housing cavity 21 exceeds the pressure in the second housing cavity 23 by a specific value, the body 12 starts to move from the first position, along axis A, to the second position. The specific pressure value depends above all on the resilient member 31 and a cross-sectional flow area of the channel 24. Accordingly, the resilient member 31 and the flow area of the channel 24 are selected so as to allow movement of the body 12 when the pressure in the first housing cavity 21 has increased to a level that represents a standard vapor flow rate. The inner diameter of the housing 11 is typically larger at the outlet side 22 in comparison with the inlet side 20. Thus, when the body is located in the second position, the inner surface 27 of the housing 11 no longer obstructs the groove 26, which thereby is uncovered and allows vapor to flow through the housing 11.

The blocking member 25 obstructs the channel 24 when the body 12 reaches the second position. As a consequence of the channel obstruction, the pressure difference between the first housing cavity 21 and the second housing cavity 23 has to decrease below the pressure difference value needed to move the body from the first to the second position.

Since the magnet 32 is connected to the first damper part 29 which is integrated with the body 12, the sensor 15 detects whether the body 12 is located in the first position or in the second position and sends to the control unit 4 a signal indicating the body's 12 position. The control unit 4 is connected to the sensor 15 and controls the fuel pump 7 and the vapor pump 3 based on the result from the sensor 15. If the body 12 is located in the second position during the filling-up process, the vapor recovery system 2 is considered to operate satisfactory and no further action is needed. If the body 12 is located in the first position during the filling-up process, the vapor recovery system 2 is considered to malfunction and the control unit 4 will terminate the filling-up process.

Even if the body 12 and the housing 11 are illustrated as being cylindrical, they may have any suitable shape. Moreover, the channel 24 should generally not be cantered in the body 12.

The invention claimed is:

1. A vapor recovery system for recovering fuel vapor from a vehicle tank during dispensing of fuel into the vehicle tank, the vapor recovery system comprising:

a vapor recovery line for transporting fuel vapor; and a detecting device for detecting a fuel vapor flow, wherein the detecting device comprises a housing having a vapor inlet and a vapor outlet, a body movably arranged in the housing, the body having a first side defining a first housing cavity at an inlet side of the housing, and a second side defining a second housing cavity at an outlet side of the housing and a channel extending from the first side of the body to the second side of the body, the body being configured to move from a first position in the housing to a second position in the housing in dependence of a rate of fuel vapor flow flowing from the vapor inlet to the vapor outlet, and a sensor arranged to detect a location of the body within the housing.

2. A vapor recovery system according to claim 1, wherein the body is configured to allow, when the body is in the second position, a relatively higher rate of vapor flow from the vapor inlet to the vapor outlet, in comparison with the rate of vapor flow from the vapor inlet to the vapor outlet when the body is in the first position.

3. A vapor recovery system according to claim 1, wherein the housing comprises a blocking member configured to at least partially obstruct the channel of the body when the body is in the second position.

4. A vapor recovery system according to claim 1, wherein the body further comprises at least one groove configured to connect the first housing cavity with the second housing cavity when the body is in the second position.

5. A vapor recovery system according to claim 4, wherein the groove is at least partially obstructed when the body is in the first position.

6. A vapor recovery system according to claim 5, wherein an inner surface of the first housing cavity at least partially obstruct the groove in the body when the body is in the first position.

7. A vapor recovery system according to claim 1, wherein the body comprises a damper configured to damp a movement of the body.

8. A vapor recovery system according to claim 1, wherein the housing further comprises a resilient member at least partially arranged between the body and the housing, for restraining a movement of the body.

9. A vapor recovery system according to claim 1, wherein the body comprises a magnet, the sensor being configured to detect the magnet.

10. A vapor recovery system according to claim 1, wherein the body is configured to move from the first position to the second position when a pressure in the first housing cavity exceeds a pressure in the second housing cavity by a specific value.

11. A fuel dispensing unit for refueling vehicles, comprising a vapor recovery system according to claim 1.

12. A fuel dispensing unit according to claim 11, further comprising a control unit connected to the sensor, the control unit being configured to monitor dispensing of fuel, and to provide a fault signal if the body is in the first position when fuel is dispensed.

* * * * *